United States Patent [19]

Zdepski

[11] Patent Number: 5,486,864
[45] Date of Patent: Jan. 23, 1996

[54] DIFFERENTIAL TIME CODE METHOD AND APPARATUS AS FOR A COMPRESSED VIDEO SIGNAL

[75] Inventor: Joel W. Zdepski, Belle Mead, N.J.

[73] Assignee: RCA Thomson Licensing Corporation, Princeton, N.J.

[21] Appl. No.: 60,924

[22] Filed: May 13, 1993

[51] Int. Cl.⁶ .................................................. H04N 7/13
[52] U.S. Cl. ........................................ 348/423; 348/500
[58] Field of Search ............................... 358/142, 141, 358/133; 370/94.1, 94.2, 60, 60.1; 348/426, 465, 384, 500, 423, 474; 375/111; H04N 7/04, 7/08, 7/12, 5/04, 9/44, 7/13

[56] References Cited

U.S. PATENT DOCUMENTS

| | | | |
|---|---|---|---|
| 4,726,019 | 2/1988 | Adelmann et al. | 370/94 |
| 4,827,339 | 2/1989 | Wada et al. | 358/136 |
| 5,121,205 | 6/1992 | Ng et al. | 358/141 |
| 5,159,452 | 10/1992 | Kinoshita | 358/142 |
| 5,168,356 | 12/1992 | Acampora | 358/133 |
| 5,202,886 | 4/1993 | Rossi | 370/94.2 |
| 5,227,876 | 6/1993 | Cucchi | 358/142 |
| 5,274,681 | 12/1993 | Yamada et al. | 375/118 |
| 5,289,276 | 2/1994 | Siracusa et al. | 348/426 |

FOREIGN PATENT DOCUMENTS

| | | | |
|---|---|---|---|
| 0488225 | 6/1992 | European Pat. Off. | H04J 3/06 |
| 0577329 | 1/1994 | European Pat. Off. | H04N 7/13 |
| 0160113 | 12/1979 | Japan | 358/133 |
| 2177877 | 1/1987 | United Kingdom | H04L 11/20 |
| 2261799 | 5/1993 | United Kingdom | H04L 12/56 |
| WO84/00268 | 1/1984 | WIPO | H04L 11/20 |

OTHER PUBLICATIONS

Warren A. Montgomery, *Techniques for Packet Voice Synchronization*, IEEE Journal on Selected Areas in Communications, vol. SAC-1, No. 6, Dec. 1983, pp. 1022–1028.

J. P. Leduc and S. D'Agostino, *Universal VBR Videocodecs for ATM Networks in the Belgian Broadband Experiment*, Signal Processing Image Communications, vol. 3, No. 2/3, Jun. 1991, pp. 157–165.

J. Y. Cochennec, P. Adam and T. Houdoin, *Asynchronous Time–Division Networks: Terminal Synchronization for Video and Sound Signals*, GLOBECOM '85, vol. 2, 2 Dec. 1985, pp. 791–794.

*Primary Examiner*—James J. Groody
*Assistant Examiner*—Chris Grant
*Attorney, Agent, or Firm*—Joseph S. Tripoli; Eric P. Herrmann; Ronald H. Kurdyla

[57] ABSTRACT

Apparatus for developing synchronization of an intermediate layer of signal such as the transport or multiplex layer of a multi-layered compressed video signal, includes at the encoding end of the system apparatus for including a time stamp reference, such as a count value from a modulo K counter, and provision for a differential time stamp which may be updated by the transit times of respective (e.g., multiplexing) circuits as the signal transits such circuits. At the receiving end of the system a counter is responsive to a controlled receiver clock signal and the count value of this counter is sampled at the arrival of the time stamps embedded in the transport layer. The time stamps and the differential time stamps are retrieved from the signal and combined to form a corrected time stamp. The differences of successive sampled count values of the receiver counter are compared with the differences of corresponding successive corrected time stamps to provide a signal to control the receiver clock signal.

16 Claims, 5 Drawing Sheets

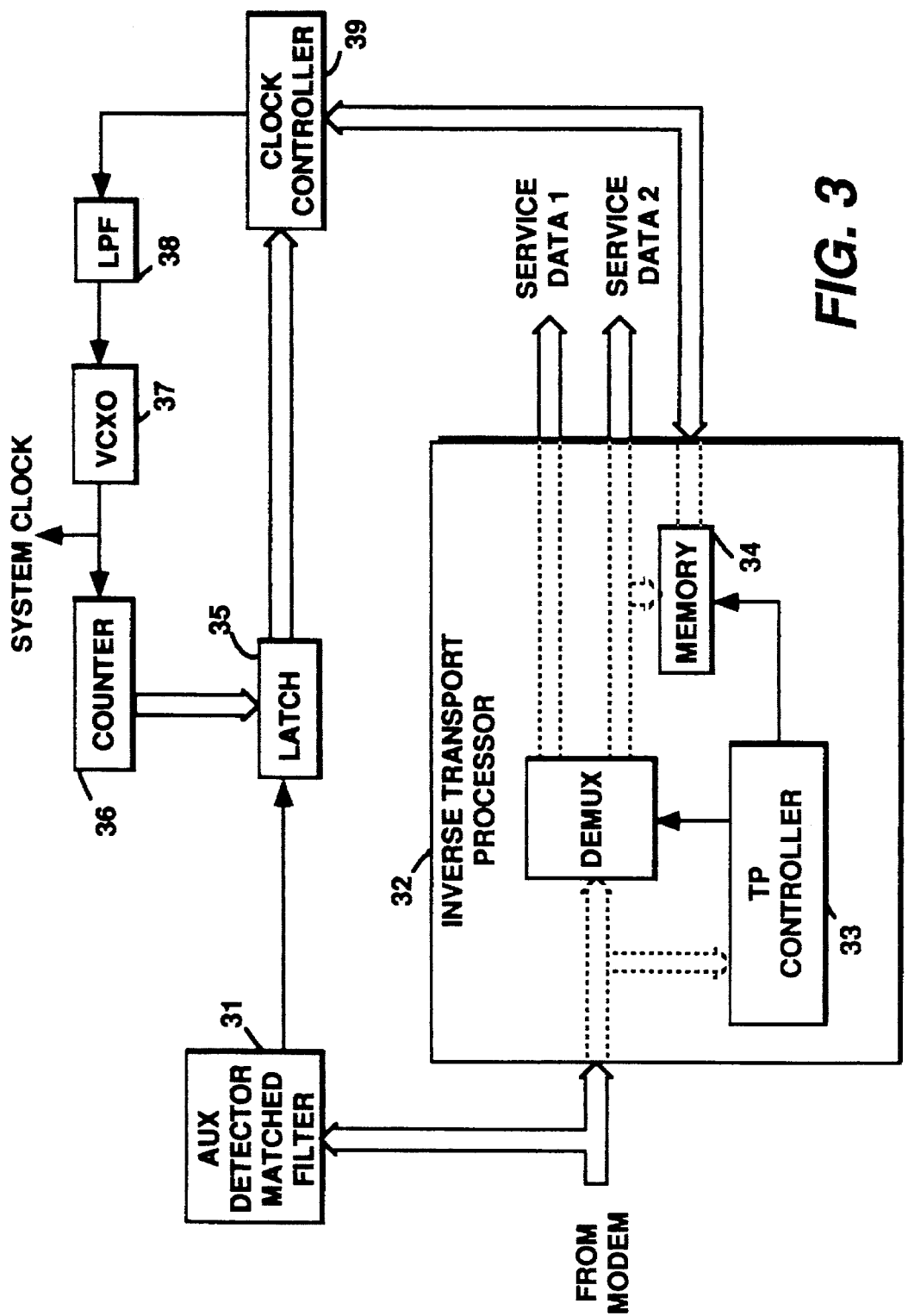

FIG. 6
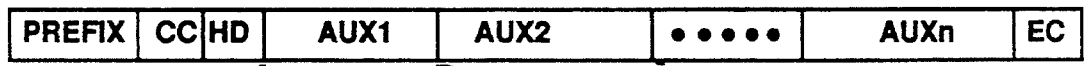
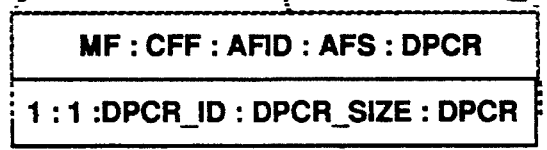
FIG. 7
FIG. 8
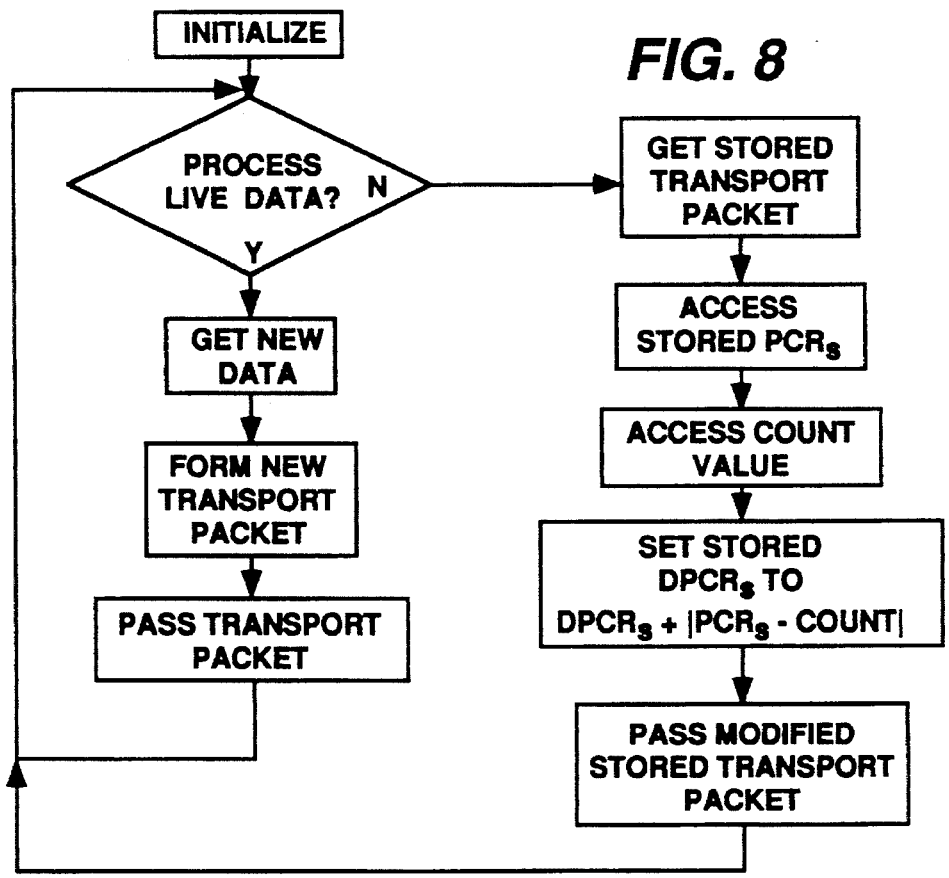

DIFFERENTIAL TIME CODE METHOD AND APPARATUS AS FOR A COMPRESSED VIDEO SIGNAL

This invention relates to a method and apparatus for providing a clock signal at a signal decompression apparatus, which clock signal is substantially frequency locked to a clock signal at a encoding apparatus.

BACKGROUND OF THE INVENTION

Compressed video signal generation and transmission systems may operate on several levels of synchronization or perhaps more properly called asynchronization. For example the actual compression apparatus will be synchronized, at least in part to the vertical frame rate of the source video signal, and it may also be synchronized to the color subcarrier. Once the video signal is compressed and formed into a particular signal protocol, such as MPEG 1, it may be further processed into transport packets for transmission. The transport packets may be time division multiplexed with packets from other video or data sources. The packetizing and multiplexing may or may not be done in a mutually synchronous fashion, which may or may not be synchronous with the compression operation. The transport packets (whether multiplexed or not) may thereafter be supplied to a modem for transmission of the data. The modem may or may not operate synchronously with the prior mentioned systems.

At the receiver of a fully multiplexed transmitted compressed signal, it is usually necessary that the various subsystems operate synchronously with their inverse function counterpart elements at the encoding end of the system. Synchronous operation in this case, in general, may mean that the respective subsystems operate extremely close to the same frequencies as their counterpart subsystems. For example, the decompressor should provide video signal at the same frame rate as provided by the video signal source at the compressor, and synchronized with associated audio. Synchronization of the video/audio decompression portion of the system may be accomplished by inserting, at the encoder, presentation time stamps within the compressed video/audio signals, that indicate the relative times of production/reproduction of respective segments of signal. Such presentation time references, PTR's, may be used to compare the timing of associated audio and video signals for synchronization purposes and for proper sequencing and continuity.

The receiver modem must of course operate at the precise frequency as the transmitting modem. Receiver modems typically include phase locked loops responsive to the transmitted carrier frequencies or eye patterns for generating synchronous clock signals.

Synchronization of the multiplexing and or transport packetizing apparatus tends to be somewhat more complicated for two reasons. The first is that multiplexed data may be arriving sporadically. The second is that rate buffering is usually employed between the modem and the decompressor, and provision must be made to insure that the rate buffer neither overflows nor underflows with the constraint that the buffer be kept as small as practical to minimize manufacturing cost.

SUMMARY OF THE INVENTION

The present invention relates to a system and apparatus for inserting modifiable differential time codes or count values in a compressed video signal for developing synchronization of an intermediate layer of signal such as the transport or multiplex layer of a multi-layered compressed video signal. In an embodiment at the encoding end of the system a modulo K counter is clocked responsive to a system clock, and the count value is embedded in the signal at the transport layer according to a predetermined schedule. Auxiliary transport packets arranged to include differential count values are also embedded in the signal according to said schedule. In an embodiment at signal transmission locations where the compressed video signal may be queued, provision is made to measure the time, in counts of clock pulses of said system clock frequency, of the time the signal is delayed, and to access and update the differential count value in said auxiliary transport packet with the value of the delay measurement. In an embodiment at the receiving end of the system the count value and the differential count value are accessed and combined to form combined count values. A counter, similar to the counter at the encoding end of the system, is responsive to a controlled receiver clock signal and the count values provided by this counter are sampled at the arrival of the count values embedded in the transport layer. The differences of successive sampled count values of the receiver counter are compared with the differences of corresponding successive combined count values to provide a signal to control the receiver clock signal.

BRIEF DESCRIPTION OF THE DRAWINGS

FIGS. 3 and 5 are block diagrams of alternative embodiments of clock recovery apparatus for use with transmitted compressed video data.

FIGS. 6 and 7 are pictorial diagrams of a transport block and an auxiliary signal transport block.

FIG. 8 is a flow chart of the operation of the transport processor of FIG. 2.

DETAILED DESCRIPTION

Figure 1:
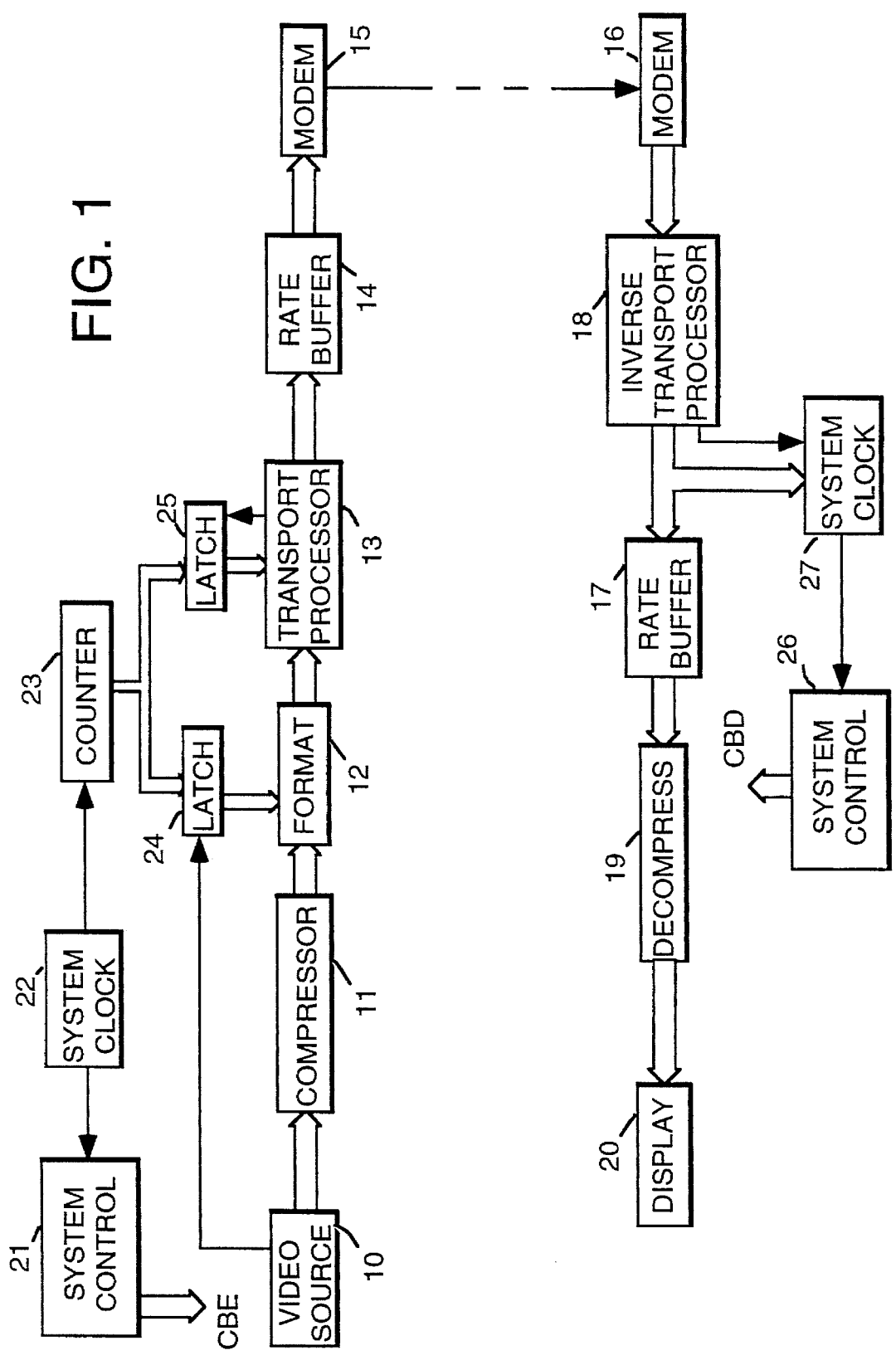
FIG. 1 is a block diagram of a compressed video encoding/decoding system incorporating clock recovery apparatus embodying the present invention.

FIG. 1 illustrates the general form of a system in which the invention may be practiced, which system is a compressed digital video signal transmission arrangement. In this system, video signal from a source 10 is applied to a compression element 11 which may include a motion compensated predictive encoder utilizing discrete cosine transforms. Compressed video signal from the element 11 is coupled to a formatter 12. The formatter arranges the compressed video signal and other ancillary data according to some signal protocol such as MPEG, a standard developed by the International Organization for Standardization (Organisation Internationale De Normalisation). The standardized signal is applied to a transport processor 13, which divides the signal into packets of data and adds certain overhead to provide some noise immunity for the transmission purposes. The transport packets, which normally occur at a non-uniform rate are applied to a rate buffer 14 which provides output data at a relatively constant rate conducive to efficient use of a relatively narrow bandwidth transmission channel. The buffered data is coupled to a modem 15 which performs the signal transmission.

A system clock 22 provides clocking signal to operate much of the apparatus, at least including the transport processor. This clock will operate at a fixed frequency such as 27 MHz for example. As shown herein, however, it is used to generate timing information. The system clock is coupled to the clock input of a counter 23 which may be arranged to count modulo $2^{30}$, for example. The count values output by the counter are applied to two latches 24 and 25. The latch 24 is conditioned by the video source to latch count values on the occurrence of respective frame intervals. These count values are denoted presentation time stamps, PTR's, and are included in the compressed video signal stream by the formatter 12, and are used by the receiver to provide lip-synchronization of associated audio and video information. The latch 25 is conditioned by the transport processor 13 (or the system controller 21) to latch count values according to a predetermined schedule. These count values are denoted program clock references, PCR's, and are embedded as auxiliary data within respective auxiliary transport packets.

The system controller 21 is a variable state machine programmed to coordinate the various processing elements. Note that the controller 21, the compressor 11 and the transport processor 13, may or may not operate synchronously via a common clocking arrangement as long as proper handshaking is provided between processing elements.

Elements 16–26 of FIG. 1 comprise a receiving end of the transmission system wherein the modem 16 performs the inverse function of the modem 15. Data from the modem 16 is applied to an inverse transport processor 18, which provides compressed video signal formatted according to the system protocol, to the rate buffer 17. The rate buffer 17 then provides the compressed video signal to the decompressor 19 on demand. The decompressor, responsive to the compressed video signal generates non-compressed video signal for display on the device 20, or for storage etc., in an appropriate device.

The inverse processor 18 also provides PCR's from the auxiliary transport data, and control signals to a system clock generator 27. The clock generator responsive to these signals generates a system clock signal synchronous with at least the transport processor operation. This system clock signal is applied to the receiver system controller 26 to control the timing of appropriate processing elements.

Figure 2:
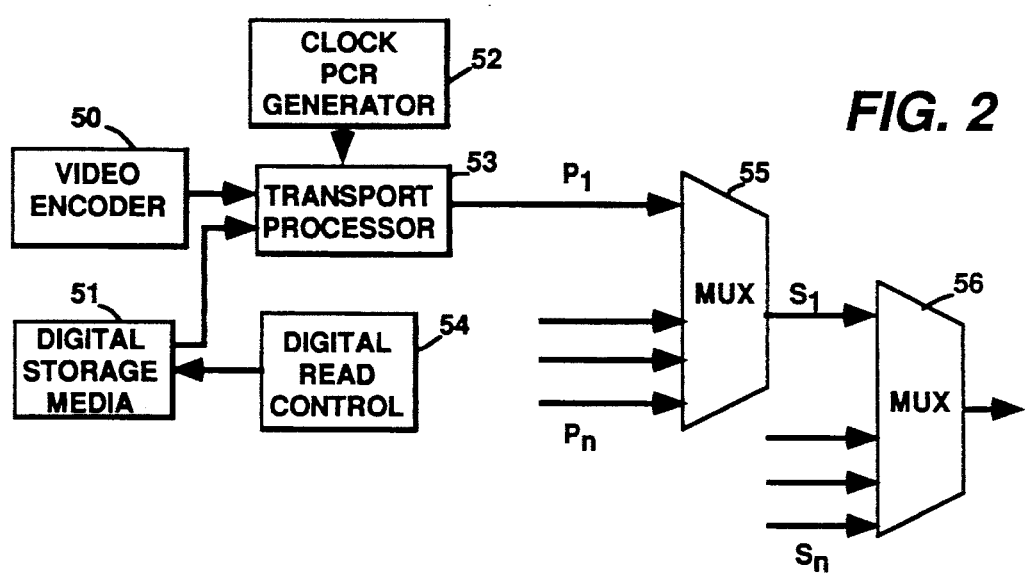
FIG. 2 is a block diagram of signal multiplexing apparatus useful in representing the development of multiplexed data from different sources.

Refer to FIG. 2 which illustrates apparatus which may be included in the transmission modem 15 for example. The modem may receive data from a plurality of sources, which data is all to be transmitted on a common transmission channel. This may be accomplished by time division multiplexing of the various signals from the various sources. In addition the multiplexing may be layered. For example video programs, $P_i$, may be generated in different studios, and coupled to a first multiplexer 55. These programs are time division multiplexed according to known techniques and provided as a source signal $S_1$.

The signal $S_1$, and other source signals $S_i$, from other sources are applied to a second layer multiplexer 56, wherein the signals $S_i$ are time division multiplexed according to known techniques and predetermined scheduling. Finally, within the respective programs themselves, there may be a further form of multiplexing. This multiplexing may take the form of commercials inserted into program material or of stored material inserted between segments of live production material. In these latter cases it is presumed that the commercials or stored material has been pre-encoded with respective PTR's and PCR's. In this instance the PTR's and PCR's of the stored material will be unrelated to the real time PTR's and PCR's of the live material. Regarding the PTR's, this will typically not create problems because the video signal will include parameters instructing the decompressor to re-initialize to new signal. Conversely the lack of correlation between the stored and real time PCR's may totally disrupt the rate buffer-inverse transport processor elements of a receiver system do to loss of synchronization.

In FIG. 2 it is assumed that the transport processor 53 includes a multiplexing apparatus similar in operation to the distinct multiplexers 55 and 56.

A further problem exists within a multiplexed system. In order not to lose data at respective multiplexing sites if data concurrently arrives from a plurality of sources, it is necessary to provide a degree of signal buffering within the multiplexers. These buffers will impose a delay T±δt, where δt represents a jitter component. Assume a program transits 100 multiplexers (an exaggerated number to accentuate the problem), and each multiplexing adds 1 sec.±1μsec. of delay. The end to end delay is 100 sec.±100 μsec. of delay. The 100 seconds of delay is of little consequence to the decompressor because the compressed video and thus the PTR's have undergone the same delay. The ± 100 μsec. of jitter must be accommodated or else the decoder buffer may overflow or underflow.

FIG. 3 illustrates a first embodiment of a receiver clock regenerator. In this embodiment, the transport processor may be located ahead of the rate buffer 17, in the signal path, to eliminate variable delays which may be incurred in the receiver rate buffer. Data from the receiver modem is coupled to an inverse transport processor 32, and an auxiliary packet detector 31. The inverse transport processor 32 separates transport header data from the respective transport packet payloads. Responsive to the transport header data, the processor 32 applies video signal payloads (designated here as service data 1) to, for example, decompression apparatus (not shown), and auxiliary data (designated as service data 2) to the appropriate auxiliary data processing elements (not shown). The PCR's residing within the auxiliary data are routed and stored in a memory element, 34.

The auxiliary packet detector 31, which may be a matched filter arranged to recognize the codewords designating an auxiliary transport packet containing a PCR, produces a control pulse on the occurrence of transport packets containing such data. The control pulse is utilized to store within a latch 35, the count value currently exhibited by the local counter 36. The local counter 36 is arranged to count pulses provided by a e.g., voltage controlled oscillator 37. The counter 36 is arranged to count modulo the same number as its counterpart counter in the encoder (counter 23).

The voltage controlled oscillator 37 is controlled by a low pass filtered error signal provided by a clock controller 39. The error signal is generated in the following fashion. Let the PCR arriving at time n be designated $PCR_n$ and the count value concurrently latched in latch 35 be designated $L_n$. The clock controller reads the successive values of PCR's and L's and forms an error signal E proportional to the differences $$E \rightarrow |PCR_n - PCR_{n-1}| - |L_n - L_{n-1}|$$

The error signal E, is utilized to condition the voltage controlled oscillator 37 to a frequency tending to equalize the differences. The error signal produced by the clock controller 39 may be in the form of a pulse width modulated signal, which may be rendered to an analog error signal by implementing the low pass filter 38 in analog components.

The constraints on this system are that the counters at the two ends of the system count the same frequency or even multiples thereof. This requires that the nominal frequency of the voltage controlled oscillator be fairly close to the frequency of the frequency of the system clock of the encoder.

The foregoing approach provides rather rapid synchronization but may introduce a long term error. Long term error LTE is proportional to the difference $$LTE \Rightarrow |L_n - L_o| - |PCR_n - PCR_o|$$

where $PCR_0$ and $L_0$ are for example the first occurring PCR and the corresponding latched value of the receiver counter. Nominally the error signals E and LTE will vary in discrete steps. As such, once the system is "synchronized" the error signal will dither one unit about the null point. The preferred method of synchronization is to initiate control of the voltage controlled oscillator using the error signal E until a one unit dither occurs in the error signal E, and then to switch to the use of the long term error signal LTE to control the voltage controlled oscillator.

In order to accommodate the delays, $T\pm\delta t$, incurred in the multiplexing process, the transport processor at the encoder creates an auxiliary field within an auxiliary transport packet which contains information relating to variable delays. Provision is made for modifying this variable delay information at respective multiplexing locations. Refer to FIGS. 6 and 7. FIG. 6 illustrates pictorially a trysport packet of a type used in the High Definition Television System developed by the Advanced Television Research Consortium. This transport packet includes a prefix which contains, among other things, a general identifier to indicate to which service the payload contained within the packet is related. The field CC is a continuity check value included for error check purposes. The HD field is a service specific header which specifically defines the payload. For example, if the particular service is designated to provide television programming, respective payloads of the transport packets of that service type may include audio data, video data, or related auxiliary data. The HD field thus indicates the particular payload type for the particular packet.

FIG. 7 illustrates a transport packet which includes auxiliary data. The payload of an auxiliary transport packet may include one or more auxiliary groups, depending on the amount of data included in respective groups and the current system requirements. In the trysport packet illustrated in FIG. 7 there are two auxiliary groups confining data related to the program clock reference, AUX1 and AUX2. The auxiliary group AUX1 includes data related to variable delays and the group AUX2 includes the PCR per se. The respective groups include an auxiliary group prefix and an auxiliary data block. The prefix includes the fields MF, CFF, AFID, andd AFS. The MF field is a 1-bit field which indicates whether the dam in the packet is modifiable (1 if modifiable 0 if not). CFF is a 1-bit field which indicates whether auxiliary data is defined for this group. AFID is a 6-bit field which identifies the type of auxiliary data contained in the group, e.g., time code, scramble key, copyright, etc. AFS is an 8-bit field defining the number of bytes of auxiliary data contained in the group.

The AUX1 group is shown as being modifiable and the AUX2 group is shown as not being modifiable. AUX2 data is shown to be PCR data i.e. the program clock reference. The AUX1 data is indicated as DPCR data which is an acronym herein for differential program clock reference. The PCR data is captured under control of a scheduler which controls the transport processor in the encoder. DPCR data is captured as will be described with reference to FIG. 4.

Figure 4:
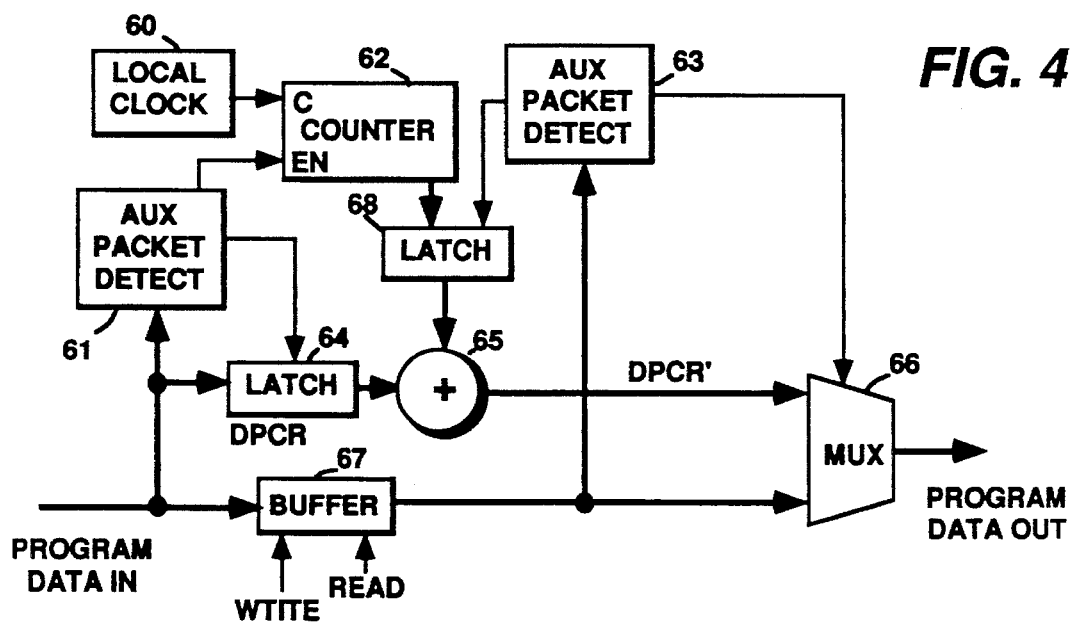
FIG. 4 is a block diagram of signal multiplexing apparatus including a system for augmenting timing references included within the multiplexed signal.

The FIG. 4 apparatus is exemplary apparatus of a portion of one of the multiplexer circuits shown in FIG. 2. Associated with respective input busses is a buffer store 67 which may be a FIFO. Data is stored therein when program data arrives and the multiplexor is currently accessing a different input bus. Thereafter, according to the scheduling of the multiplexer, the program data is read from the buffer store 67.

Respective transport packets of the program data include auxiliary groups containing PCR and DPCR data. Note that the value of the PCR data is determined relative to the timing of the transport packet containing the auxiliary timing information. This PCR data, when output by the multiplexer, may be in error by virtue of any delays incurred in multiplexing contention. The delay time $T\pm\delta t$ taken to transit the buffer store is used to modify the DPCR data to subsequently correct such errors. An auxiliary packet detector, 61, arranged to detect the occurrence of transport packets containing DPCR data, is coupled to the program data input bus. This detector functions to reset and enable a counter 62 to count pulses of a local clock 60. The local clock 60 may be a crystal oscillator having a frequency which is very close to the encoder system clock frequency, or it may be frequency locked to the encoder clock as per the operation of the FIG. 3 or 5 apparatus. A further auxiliary packet detector 63 is coupled to the output bus of the buffer store 67, and is arranged to store current count value output the counter 62 in the latch 68 when the auxiliary packet containing the DPCR data emerges from the buffer. At this time the output of the counter will exhibit a count value, in units of cycles of the clock frequency, of the transit time through the buffer of the particular packet. Note, if a plurality of auxiliary packets are likely to occur in close proximity, such that more than one may be concurrently transiting the buffer 67, the auxiliary packet detectors must be arranged to detect and respond to each occurring packet.

The auxiliary packet detector 61 also provides a control signal which is applied to condition a latch 64 to store the DPCR value contained within the auxiliary packet. This value is applied to one input port of an adder 65. The local count value stored in the latch 68 is applied to the second input port of the adder 65. The adder 65 sums the DPCR data from the current auxiliary packet with the local count value to provide an updated DPCR value DPCR'. The program data from the buffer 67 and the output of the adder 65 are coupled to respective input ports of a 2-to-1 multiplexer 66. The multiplexer 66 is conditioned by the auxiliary packet detector 63 to normally pass the program data. However when the DPCR data contained in the program data emerges from the buffer, the multiplexer 66 is conditioned to pass the updated DPCR' data from the adder, and then switch back to passing data from the buffer 67.

When the multiplexer 66 is conditioned to pass data from the adder, the output signal from the adder corresponds to the sum of the DPCR data contained in the auxiliary packet plus the count value in the counter 62 when the DPCR data emerges from the buffer. The data substituted for the DPCR data by the multiplexer 66 is thus the prior DPCR data corrected for its transit time in the buffer 67. Note, it is recommended that the auxiliary packet detector be programmed to only change program data in accordance with the appropriate modifier flags, MF, of the auxiliary groups.

Referring back to FIG. 2, the transport processor 53 will establish the DPCR auxiliary groups and normally insert a zero value for the DPCR data corresponding to new programs. Recall however, that stored data from the digital storage media 51 may be inserted between segments of live data, and that the stored data may be pre-encoded with PCR and DPCR codes. When the transport processor 53 is to insert stored data between segments of live data, it accesses the PCR code of the stored data and subtracts this PCR value from the count value currently exhibited by the counter 23 and/or latch 25. The transport processor then adds this difference to the DPCR value in the auxiliary packets of the stored data. The new DPCR values in the stored data inserted between live data now contains a reference to current time. This process is illustrated in the flow chart of FIG. 8. which is self explanatory.

Figure 5:
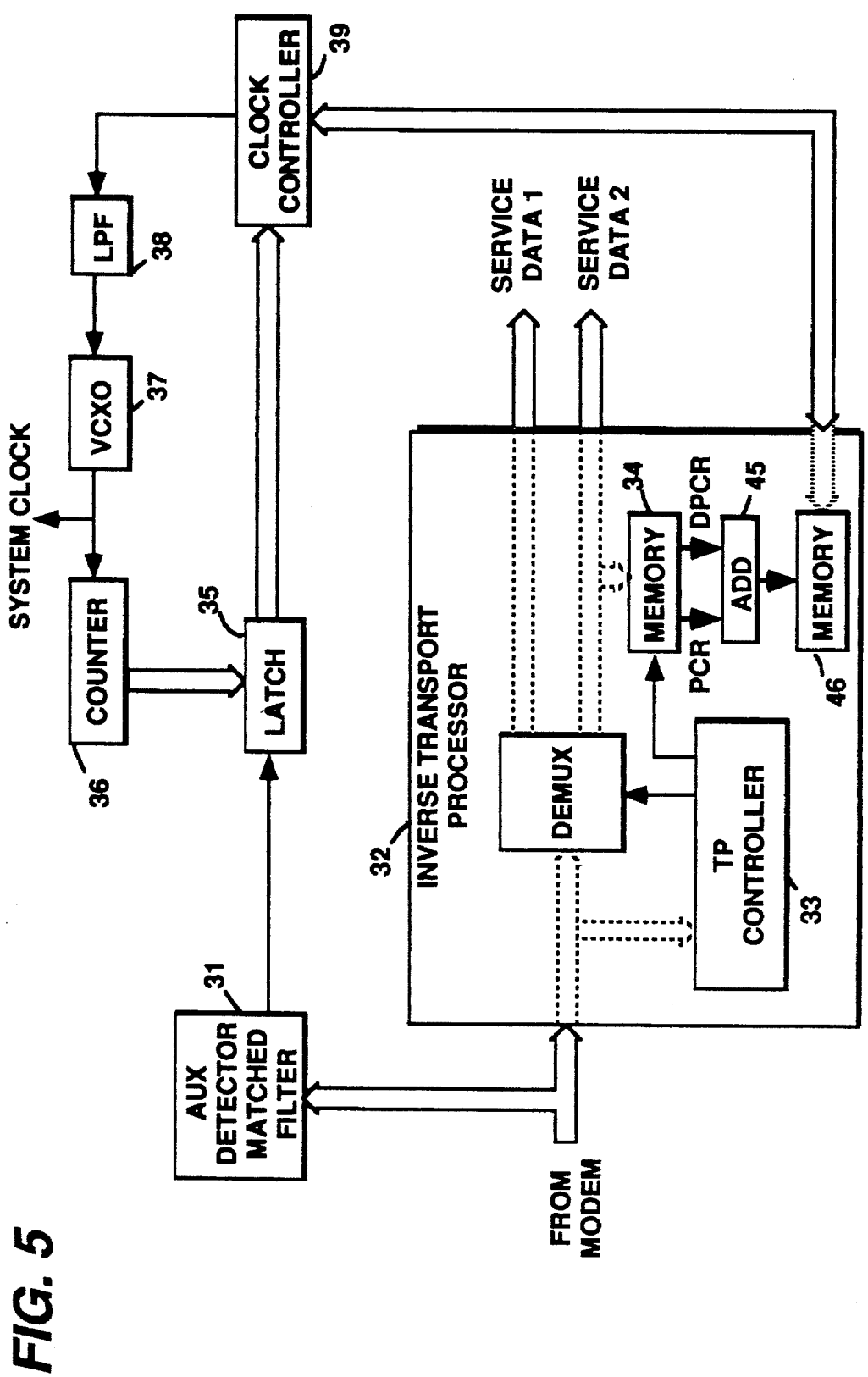

The use of the DPCR data in a receiver is illustrated in FIG. 5. In FIG. 5 elements designated with the same numerals as elements in FIG. 3 are similar and perform similar functions, except that the function of element 32 has been modified. The modification involves including adder 45 arranged to sum the corresponding PCR and DPCR values arriving in associated auxiliary groups. The sums provided by the adder correspond to the original PCR value augmented by any transit delays incurred in multiplexing for example. The sums are placed in memory 46 where they are available to the clock controller 39 as corrected PCR' values for system clock synchronization.

What is claimed is:

1. Apparatus for providing a compressed video signal comprising:

a source of compressed video signal;

means for segmenting said compressed video signal and forming segments of said compressed video signal into video transport packets having transport headers and compressed video payloads;

means for generating time stamps;

means for forming auxiliary transport packets having auxiliary transport headers and payloads including said time stamps and a modifiable field for including further timing information related to incremental delays incurred by the auxiliary transport packet during subsequent transmission processing of said auxiliary transport packet; and means for interspersing said video transport packets with said auxiliary transport packets to form a compressed video signal for transmission.

2. Apparatus for providing compressed video signal for transmission or storage, comprising:

a source of compressed video signal formatted according to a predetermined protocol;

a source of clock pulses;

counting circuitry conditioned to count said clock pulses modulo K, where K is an integer and to periodically capture a count value;

a transport processor arranged to segment said compressed video signal into respective video transport packets including a transport header and a payload consisting of a segment of said compressed video signal, and to form auxiliary transport packets including a transport header and a payload including groups of auxiliary data, one of said groups of auxiliary data provided to contain non-modifiable data including respective captured count values, and another of said groups of auxiliary data arranged to include a differential count value, DPCR which is used to synchronize a receiver clock signal and is similar to said count values, and which is initially set to a predetermined value; and a multiplexer for interspersing said video transport packets and said auxiliary transport packets to provide said compressed video signal for transmission or storage.

3. The apparatus set forth in claim 2 further including;

a source of further compressed video signal arranged in further video transport packets interspersed with further auxiliary transport packets including further count values;

means for retrieving said further count values from said further auxiliary transport packets of said further compressed video signal, and for updating said differential count values as a function of said captured count values and retrieved said further count values; and wherein said multiplexer multiplexes said video transport packets and said further video transport packets and intersperses therewith said auxiliary transport packets such that said groups of auxiliary data arranged to include said differential count value are updated with said further count values from the further auxiliary transport packets when said auxiliary transport packets are interspersed between said further video transport packets.

4. The apparatus set forth in claim 2 further including;

a source of further compressed signal to be time division multiplexed with said compressed video signal for transmission or storage;

a multiplexer having a plurality of input terminals, for selectively providing signal at an output terminal from one of said plurality of input terminals;

a storage buffer having an input coupled to receive said compressed video signal for transmission or storage, and having an output coupled to one of said plurality of input terminals of said multiplexer, said storage buffer arranged to store said compressed video signal for transmission or storage during intervals that said multiplexer does not accept signal from said one of said plurality of input terminals, and includes;

a source of clock pulses;

means for measuring the transit time of signal through said storage buffer in units of said clock pulses; and means for incrementing the differential count values in auxiliary transport packets passed through said storage buffer by the measured transit time of said auxiliary transport packets.

5. Apparatus for providing a compressed video signal comprising:

a source of video signal;

compression means coupled to said source for providing compressed video signal components including descriptive headers and data representing pixel information formatted according to a predetermined protocol;

a system clock for providing clock pulses;

a counting circuitry for counting said clock pulses modulo K, where K is an integer and for periodically storing count values;

a transport processor coupled to receive formatted compressed video, for;

a) dividing said compressed video signal into segments of predetermined amounts of data, and forming transport headers, said transport processor concatenating respective transport headers with payloads consisting of respective segments of said compressed video signal to form respective video transport packets, b) forming auxiliary transport packets of information including at least said count values, c) forming further auxiliary transport packets of information arranged to include a modifiable count value for use in synchronizing a receiver clock signal, and d) forming an interspersed signal including said compressed video signal transport packets interspersed with said auxiliary transport packets, and said further auxiliary transport packets; and means for conveying said compressed video signal transport packets interspersed with said auxiliary and further auxiliary transport packets.

6. The apparatus set forth in claim 5 further including:

a source of stored compressed video signal, formatted similar to compressed video signal provided by said compression means and arranged in video transport packets similar to transport packets provided by said transport processor, and including auxiliary transport packets containing further count values; and wherein said transport processor further includes;

means for accessing said auxiliary transport packets in said stored compressed video signal, and determining the value of said further count values in such auxiliary transport packets;

means for updating said modifiable count values in said further auxiliary transport packets with values representative of the determined values; and means for selecting video transport packets from one of said source of stored compressed video signal or the video transport packets formed by said transport processor, and interspersing said selected video transport packets with said further auxiliary transport packets having said updated modifiable count values.

7. Apparatus for providing a compressed video signal comprising:

a source of compressed video signal including presentation time references (PTR'S);

means for generating time stamps (PCR'S) having a synchronizing relation with said compressed video signal;

transport processor circuitry for forming transport packets including payloads and transport headers identifying respective payloads, and for segmenting said compressed video signal, including said presentation time references (PTR'S), into respective ones of said payloads, and forming a data field for including said time stamps (PCR'S) and forming a further data field for including timing information for use in synchronizing a receiver clock signal, and related to incremental delays incurred by transport packets during subsequent transmission processing of respective transport packets said transport processor including said time stamps (PCR'S) in said data field and said further data field in ones of said transport packets.

8. Apparatus for providing compressed video signal for transmission or storage, comprising:

a source of compressed video signal formatted according to a predetermined protocol, and including presentation time references (PTR'S);

a source of clock pulses;

counting circuitry conditioned to count said clock pulses modulo K, where K is a positive integer, and responsive to a transport processor to periodically capture a count value (PCR);

a transport processor for segmenting said compressed video signal into respective video transport packets including a transport header and a payload, said payload consisting of said segment of said compressed video signal which may include a presentation time reference, and for forming a data field for containing a count value (PCR) and a further data field containing a differential count value, DPCR which is similar to said count values (PCR), and which is initially set to a predetermined value, said transport processor including said captured count values (PCR) in said data field and said further data fields in ones of said transport packets; and wherein said differential count value is made available for synchronize a receiver system clock signal.

9. Apparatus for providing compressed video signal for transmission or storage, comprising:

a source of compressed video signal formatted according to a predetermined protocol;

a source of clock pulses;

counting circuitry conditioned to count said clock pulses modulo K, where K is a positive integer and to periodically capture a count value;

a transport processor for segmenting said compressed video signal into respective video transport packets including a transport header and a payload consisting of a segment of said compressed video signal, and for forming a further data field containing a differential count value, DPCR which is similar to said count values, and which is initially set to a predetermined value, said transport processor including said captured count values and said further data fields in ones of said transport packets;

a source of further compressed signal to be time division multiplexed with said compressed video signal for transmission or storage;

a multiplexer, having a plurality of input terminals, for selectively providing signal at an output terminal from one of said plurality of input terminals;

a storage buffer having an input coupled to receive said compressed video signal for transmission or storage, and having an output coupled to one of said plurality of input terminals of said multiplexer, said storage buffer arranged to store said compressed video signal for transmission or storage during intervals that said multiplexer does not accept signal from said one of said plurality of input terminals, and includes;

a source of further clock pulses;

a counter measuring the transit time of signal through said storage buffer in units of said further clock pulses; and means for incrementing the differential count values in said transport packets passed through said storage buffer by the measured transit time.

10. Apparatus for providing a compressed video signal comprising:

a source of compressed video signal including presentation time references (PTR'S);

means for generating time stamps (PCR'S) having a synchronizing relation with said compressed video signal;

transport processor circuitry for forming transport packets including payloads of said compressed video signal and transport headers identifying respective payloads, and for including in ones of said transport packets, said time stamps (PCR'S) and a further data field for including timing information related to time stamps of stored compressed video signal wherein said timing information related to time stamps of stored compressed video signal is for synchronizing a receiver system clock signal.

11. Apparatus for providing a compressed video signal comprising:

a source of compressed video signal including presentation time references;

means for generating time stamps having a synchronizing relation with said compressed video signal;

transport processor circuitry for forming transport packets including payloads of said compressed video signal and transport headers identifying respective payloads, and means for including in ones of said transport packets, said time stamps and a further data field for including timing information related to one of time stamps of stored compressed video signal and incremental delays incurred by transport packets during subsequent transmission processing of respective transport packets;

a source of further compressed signal to be time division multiplexed with said compressed video signal for transmission or storage;

multiplexing means, having a plurality of input terminals, for selectively providing signal at an output terminal from one of said plurality of input terminals;

a storage buffer having an input coupled to receive said compressed video signal for transmission or storage, and having an output coupled to one of said plurality of input terminals of said multiplexing means, said storage buffer arranged to store said compressed video signal for transmission or storage during intervals that said multiplexing means does not accept signal from said one of said plurality of input terminals; and includes;

a source of clock pulses;

means for measuring the transit time of signal passed through said storage buffer in units of said clock pulses; and means for incrementing, by the measured transit time, values contained in said further data field in transport packets passed through said storage buffer.

12. Apparatus for providing a compressed video signal comprising:

a source of compressed video signal including presentation time references;

means for generating time stamps having a synchronizing relation with said compressed video signal;

transport processor circuitry for forming transport packets including payloads of said compressed video signal and transport headers identifying respective payloads, and means for including in ones of said transport packets, said time stamps and a further data field for including timing information related to count values of further compressed video signal;

a system clock for providing clock pulses;

a counting circuitry for counting said clock pulses modulo K, where K is an integer and responsive to said transport processor circuitry for storing current count values and providing said current count values for insertion in said ones of said transport packets;

a source of said further compressed video signal including said count values of said further compressed video signal for aiding synchronization of a receiver clock signal;

and said transport processor circuitry includes; means for accessing said count values from said further compressed video signal for generating said timing information related to said count values of said further compressed video signal.

13. Apparatus for providing a compressed video signal comprising:

a source of video signal;

compression means coupled to said source of video signal for providing compressed video signal components including descriptive headers and data representing pixel information formatted according to a predetermined protocol;

a system clock for providing clock pulses;

a counter for counting said clock pulses modulo K, where K is an integer;

means for periodically storing current count values provided by said counter;

a source of further compressed video signal including further count values for use in synchronizing a receiver clock signal;

a transport processor coupled to receive formatted compressed video signal, and said further compressed video signal for providing a sequence of signal packets including said compressed video signal or said further compressed video signal, wherein ones of packets in a sequence of compressed video signal packets are identifiable as including data representing said current count values and ones of packets in a sequence of said further compressed video signal are identifiable as including data representing said further count values and said current count values; and means for conditioning said sequence for transmission.

14. The apparatus set forth in claim 13 further including;

a source of further signal packets;

means for multiplexing said sequence of signal packets with said further signal packets; and means for modifying said count values in said sequence of signal packets as a function of incremental delays incurred by transport packets by virtue of said means for multiplexing.

15. The apparatus set forth in claim 13 wherein said identifiable transport packets are auxiliary transport packets having auxiliary transport headers and payloads including said current count values and a modifiable field for including timing information related to one of said further count values of said further compressed video signal and incremental delays incurred by the auxiliary transport packet during subsequent transmission processing of said auxiliary transport packet, and wherein the header of the auxiliary transport packets includes a flag which indicates whether a field is modifiable.

16. The apparatus set forth in claim 13 wherein said transport processor includes first and second flags in respective transport packets, said first flag having first and second states indicating whether a respective transport packet includes or does not include respectively, said current count value, and said second flag having first and second states indicating if a respective transport packet includes or does not include respectively, said further count value related to said further compressed video signal.

* * * * *

UNITED STATES PATENT AND TRADEMARK OFFICE
CERTIFICATE OF CORRECTION

PATENT NO. : 5,486,864
DATED : January 23, 1996
INVENTOR(S) : Joel W. Zdepski

It is certified that error appears in the above-indentified patent and that said Letters Patent is hereby corrected as shown below:

Title page, "References Cited","U.S. PATENT DOCUMENTS", insert:
---5,052,029  9/1991  James et al. .......... 375/107
   5,287,182  2/1994  Haskell et al. ........ 348/500---

Column 10, line 6, after "containing", delete "a" and insert ---said---

Column 10, line 15, before "a receiver", delete "synchronize" and insert ---synchronizing---

Column 12, line 42, after "modifying said", insert ---further---

Signed and Sealed this

Twenty-sixth Day of August, 1997

Attest:

BRUCE LEHMAN

Attesting Officer

Commissioner of Patents and Trademarks